(No Model.)
R. R. BROUNER.
CURTAIN FIXTURE.
No. 327,378. Patented Sept. 29, 1885.
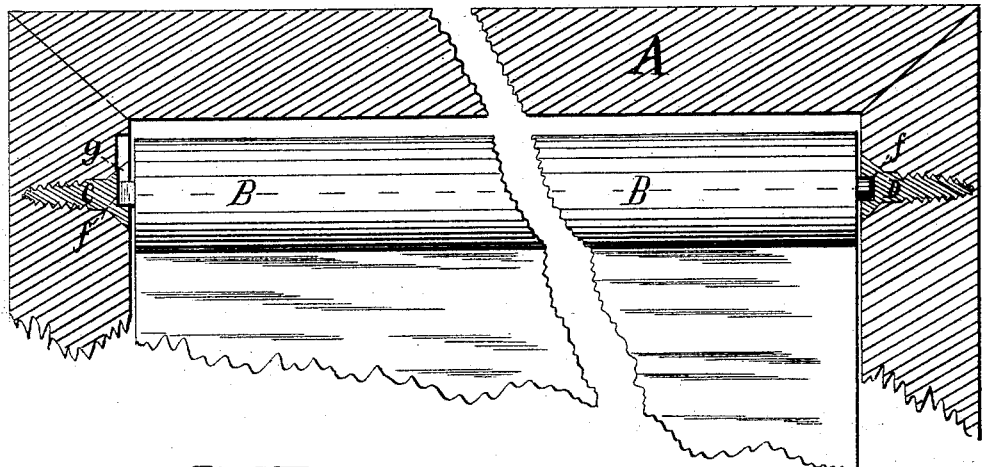
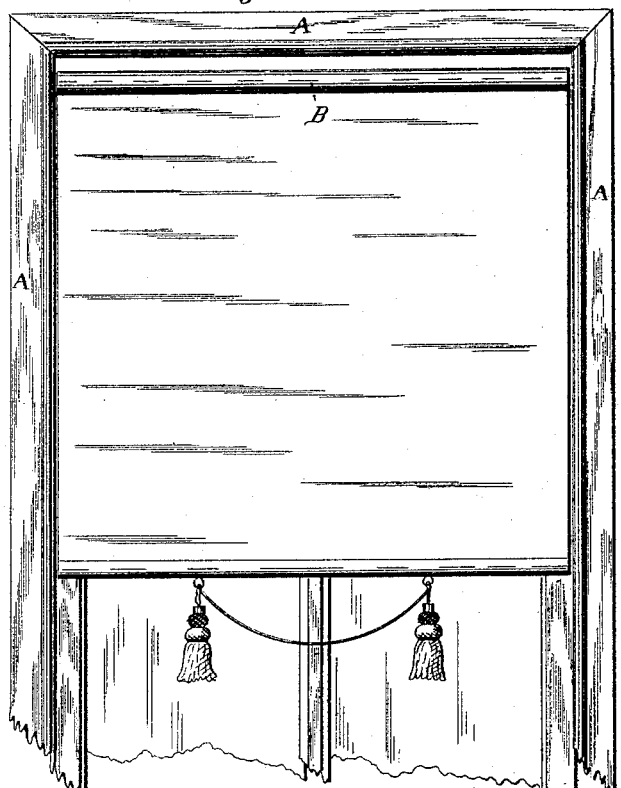
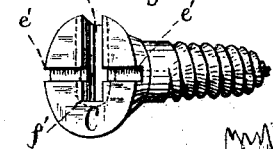
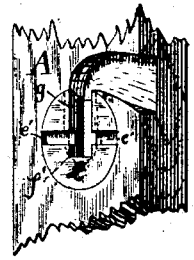
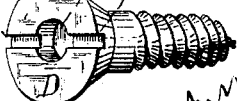
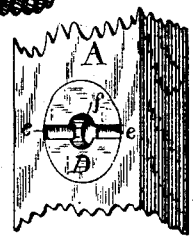
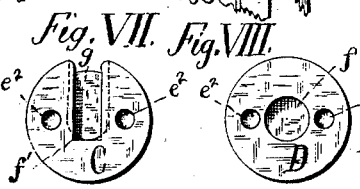
Attest:
F. A. Hopkins
H. S. Knight
Inventor,
R. R. Brouner
By Knight Bros
Attorneys

UNITED STATES PATENT OFFICE.

RICHARD R. BROUNER, OF WASHINGTON, DISTRICT OF COLUMBIA.

CURTAIN-FIXTURE.

SPECIFICATION forming part of Letters Patent No. 327,378, dated September 29, 1885.

Application filed July 24, 1885. (No model.)

*To all whom it may concern:*

Be it known that I, RICHARD R. BROUNER, a citizen of the United States, residing at Washington, in the District of Columbia, have invented a new and useful Improvement in Curtain-Fixtures, of which the following is a specification.

My invention consists in constructing the bearings of curtain-rollers or bearings for like purposes so as to screw directly into the window-frame or other support to which the bearing is to be applied.

In carrying out my invention I prefer to form the journal-bearing by a suitable groove or socket, as the case may be, in the head of a wood-screw which has the ordinary nick for the reception of a screw-driver for screwing it into or out of the frame or other support or place to which it is to be applied. This construction of the bearings admits not only of fitting curtains more neatly and closely within the faces of the window-frames to which they are applied, but also affords great facility for adjusting the bearings to accurately suit the length of the rollers, or to compensate for any change which may occur in the distance between the opposite faces of the window-frame by settling or from other causes.

The invention, while particularly intended for bearings for the ends of curtain and shade rollers, is obviously applicable to other uses wherever it may be desirable for the ready application and attachment and adjustment of a roller or shaft bearing, as will be hereinafter explained.

In the accompanying drawings, Figure I is a vertical section of the top of a window-frame with bearing-screws illustrating my invention, the curtain being shown in elevation. Fig. II is a perspective view of a screw with an open bearing for the reception of the non-rotating lug of a spring-roller, or, in the case of a cord-roller, the cord-pulley journal. Fig. III is a perspective view of a portion of the frame, showing the said bearing-screw in position, and illustrating the open slot or notch in the window-frame through which the lug is introduced. Fig. IV is a perspective view of the bearing-screw for the reception of the rotating journal of a spring-roller, or the journal at the opposite end from the cord-pulley, where a cord is used. Fig. V is a perspective view of a portion of the window-frame, showing the said bearing-screw in position. Fig. VI is a front view, on a smaller scale, showing the curtain as hung with my improved bearings. Figs. VII and VIII are perspective views illustrating a modification in the screw-heads.

A is the frame of the window. B is the roller, having the ordinary roller-ends. C and D are my improved bearing-screws, designed to be used instead of the thimbles or brackets ordinarily employed to support the ends of the roller. These screws are provided with the common gimlet-point, and have the usual nicks, $e\ e$ or $e'\ e'$, for the ordinary screw-driver; or they may have holes $e^2\ e^2$, as illustrated in Figs. VII and VIII, to fit them to be driven by a screw-driver having two or more points instead of a chisel end. The latter construction may in some instances be preferable, as it avoids the sharp corners at the ends of the nicks, though of course the latter might be filed off.

The screws each have at or near the center a socket, $f$ or $f'$, for the reception of the roller-ends. The screw C for the cord end of the roller has, in addition to the socket $f'$, a slot, $g$, through which the roller-end is dropped into the socket $f'$. When a spring-roller is to be used, the screw C is to be made with a rectangular socket, as shown in full lines in Figs. II, III, and VII. For a cord-pulley the open socket has the customary round bottom shown in dotted lines in same figures.

The manner of using my invention will be readily understood from the above description. By dispensing with the brackets or thimbles now in general use and using my improved bearing-screws, whose heads are flush with the surface of the window-frame, or nearly so, I am enabled to cut my shade or curtain material an inch or more wider than can now be done, thus covering the lights of the window more completely.

Less time is required in adjusting my fixtures than those now in use, for as soon as the two screws are put in place the shade can be hung.

Should the roller-ends become loosened from long use the screw that holds the end of the roller opposite the cord end can be unscrewed a part or whole turn, again perfecting the adjustment.

In bay or bulk windows when there are obtuse angles in the frame, necessitating the use of blocks, to which the ordinary brackets are now in such cases attached, my improved bearing-screw will fasten the block and at the same time support the roller-end; or the block may be dispensed with and the screws made of sufficient length to project the required distance.

I am aware that screws have been provided with central sockets to receive a projection upon the end of a screw-driver, to prevent the slipping of the latter, and I make no claim to such construction, broadly.

I am also aware that a bearing-piece for a spring-roller has before been made in the form of a screw. My invention differs from the above in being adapted at one end to form a journal-bearing for the roller-pintle, and at the other having an open slot into, which the roller end or gudgeon can be dropped.

What I claim as new, and desire to secure by Letters Patent, is—

1. A bearing-screw having a central socket for the reception of the roller-end, substantially as and for the purpose described.

2. A bearing-screw having a central socket for the reception of the roller-end, and a slot through which the roller-journal may be dropped into the socket, substantially as shown and described.

RICH. R. BROUNER.

Witnesses:
OCTAVIUS KNIGHT,
H. S. KNIGHT.